US008815056B2

(12) United States Patent
Araki et al.

(10) Patent No.: US 8,815,056 B2
(45) Date of Patent: Aug. 26, 2014

(54) WEB ON STAMPABLE SHEET AND METHOD OF MAKING

(71) Applicant: K-Plasheet Corporation, Chiba (JP)

(72) Inventors: Yutaka Araki, Tokyo (JP); Seiji Hanatani, Chiba (JP)

(73) Assignee: K-Plasheet Corporation, Chiba (JP)

( * ) Notice: Subject to any disclaimer, the term of this patent is extended or adjusted under 35 U.S.C. 154(b) by 0 days.

(21) Appl. No.: 13/933,878

(22) Filed: Jul. 2, 2013

(65) Prior Publication Data

US 2013/0295370 A1    Nov. 7, 2013

Related U.S. Application Data

(63) Continuation of application No. 11/916,894, filed as application No. PCT/JP2006/311885 on Jun. 7, 2006, now Pat. No. 8,491,754.

(30) Foreign Application Priority Data

Jun. 7, 2005   (JP) .................................. 2005-166414

(51) Int. Cl.
*B29C 70/02*   (2006.01)
(52) U.S. Cl.
USPC .......................... 162/231; 428/297.4; 428/323
(58) Field of Classification Search
USPC .............. 162/158, 164.1, 183–185, 204–206, 162/218, 224–227, 231; 428/221, 297.4, 428/317.1, 323, 304.4, 402
See application file for complete search history.

(56) References Cited

U.S. PATENT DOCUMENTS

| 4,020,123 | A | * | 4/1977 | Trapasso ........................ 525/285 |
| 4,670,331 | A |   | 6/1987 | Radvan et al. |
| 4,734,321 | A |   | 3/1988 | Radvan et al. |
| 5,215,627 | A |   | 6/1993 | Willis et al. |
| 5,800,676 | A |   | 9/1998 | Koike et al. |
| 5,888,352 | A |   | 3/1999 | Yoshikawa et al. |
| 8,491,754 | B2 |  | 7/2013 | Araki et al. |
| 2005/0112305 | A1 | | 5/2005 | Swoboda et al. |

FOREIGN PATENT DOCUMENTS

| JP | 55-9119 | 3/1980 |
| JP | 60-158227 | 8/1985 |
| JP | 60-179234 | 9/1985 |
| JP | 02-045135 | 2/1990 |
| JP | 05-050523 | 3/1993 |
| JP | 7-314442 | 5/1995 |

(Continued)

OTHER PUBLICATIONS

Machine translation of JP 2002-069898 A, Advanced Industrial Property Network, Japan Patent Office, [online], [retrieved on Apr. 21, 2012]. Retrieved from the Internet: <URL: http://dossier1.ipdl.inpit.go.jp/AIPN/odse_top_dn.ipdl?N0000=7400 >.*

(Continued)

*Primary Examiner* — Dennis Cordray
(74) *Attorney, Agent, or Firm* — Greenblum & Bernstein, P.L.C.

(57) ABSTRACT

Web containing a thermoplastic resin, reinforcing fibers and thermal expandable particles dispersed therein. The thermoplastic resin and the reinforcing fibers are uniformly dispersed in a thickness direction and the thermal expandable particles are eccentrically located toward one-side surface of the web, wherein opposite sides of the web have substantially different specific gravity and density.

6 Claims, 1 Drawing Sheet

(56) References Cited

FOREIGN PATENT DOCUMENTS

| JP | 9-136969 | 5/1997 |
| JP | 10-072798 | 3/1998 |
| JP | 2000-328494 | 11/2000 |
| JP | 2002-069898 | 3/2002 |
| JP | 2002-069898 A * | 3/2002 |
| JP | 2003-003398 | 1/2003 |

OTHER PUBLICATIONS

English language Abstract of JP 7-314442.
English language Abstract of JP 2000-328494.
English language Abstract of JP 9-136969.
English language Abstract of JP 60-158227.
English language Abstract of JP 05-050523.
English language Abstract of JP 2002-069898.
English language Abstract of JP 2003-003398.
English language Abstract of JP 55-9119.
English language Abstract of JP 60-179234.
English language Abstract of JP 10-072798.
English language Abstract of JP 02-045135.
Machine translation of JP 07-314442.
Machine translation of JP 2000-328494.
Machine translation of JP 2002-069898.
J. Peel, Paper Science & Paper Manufacture, 1999, p. 90.
Pulp, Synthetic, Kirk-Othmer Encyclopedia of Chemical Technology, $3^{rd}$ ed, vol. 19, John Wiley & Sons, Inc., 1982, pp. 420-435.

* cited by examiner

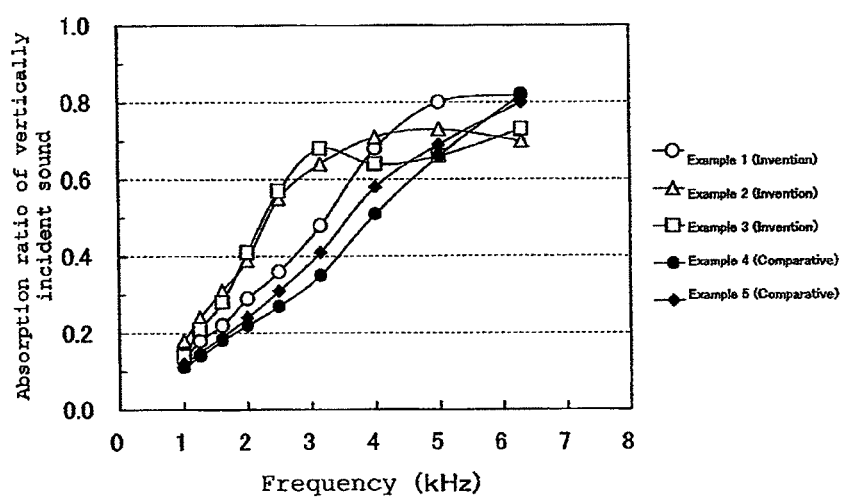

WEB ON STAMPABLE SHEET AND METHOD OF MAKING

CROSS REFERENCE TO RELATED APPLICATION

The instant application is a continuation application of U.S. patent application Ser. No. 11/916,894, which is a US National stage of PCT Application No. PCT/JP2006/311885 filed Jun. 7, 2006, designating the United States of America. The disclosures of U.S. application Ser. No. 11/916,894 is expressly incorporated by reference herein in their entireties. The present application also claims priority under 35 U.S.C. §119 of Japanese Patent Application No. 2005-166414 filed on Jun. 7, 2005.

TECHNICAL FIELD

The invention relates to a stampable sheet expanded product used as not only an inner panel member of a vehicle, an engine cover or the like but also a sound absorbing member, a sound proof wall or the like in a field of a building material, a web and a stampable sheet suitable for use in the production thereof and a method of producing the same.

RELATED ART

The stampable sheet is a composite material consisting of reinforcing fibers such as glass fiber, carbon fiber or the like and a thermoplastic resin, and is a sheet-shaped raw material suitable for shaping a large-scale member by expanding under heating and pressing. As the method of producing the stampable sheet, there is known a method wherein the reinforcing fibers and the thermoplastic resin are dispersed into a medium such as foamy solution formed by adding a surfactant to water so as to include fine bubbles and sheet-making the resulting dispersion or pouring the foamy dispersion onto a paper-making screen to remove the foam to thereby obtain a non-woven deposit (web) and thereafter heating and pressing the web and solidifying under cooling (see JP-B-55-009119).

The stampable sheet has a nature that as it is heated, the thermoplastic resin is melted and at the same time, the thickness is returned to the original web thickness before the pressing due to the action of spring back inherent to the reinforcing fibers. And, the stampable sheet is heated and expanded and press-formed to form a porous shaped product having a proper amount of pores, whereby there can be obtained an expansion molded product having a high stiffness and an excellent sound absorbing property (see JP-A-60-179234).

The above expansion molded product is a porous body wherein the reinforcing fibers oriented in a random direction are entangled with each other and bonded and fixed with the molten solidified thermoplastic resin to form a three-dimensional net-work structure. Since the stiffness of the expanded product is proportional to a product of elastic modulus and cubed thickness, in order to enhance the stiffness, it is effective to increase the elastic modulus or to thicken the thickness.

For the purpose of increasing the thickness of the expansion molded product, there are a method of increasing a thickness of a web as a starting material, and a method of enhancing an expanding property of the web. However, the increase of the web thickness unfavorably brings about the increase of the weight. Also, the expanding property of the stampable sheet is dependent upon the action of the spring back in the reinforcing fiber, so that the enhancement of the expanding property is limited.

Now, there is proposed a technique wherein the stampable sheet is mixed with thermal expandable particles having a property of expanding under heating and then expanded by heating to forcedly increase the thickness of the sheet (see JP-A-2000-328494, JP-A-H10-072798 and JP-A-H02-045135). As the thermal expandable particles, there are generally particles having a core-shell type structure with a diameter of about several dozen μm, in which the core is a liquid hydrocarbon and the shell is a thermoplastic resin having a gas barrier effect. When such particles are heated, the hydrocarbon is vaporized and expanded, while the thermoplastic resin is softened, whereby the particles are expanded into spheres having a diameter of about several hundreds μm.

DISCLOSURE OF THE INVENTION

For example, the above patent documents 3 (JP-A-2000-328494) and 4 (JP-A-H10-072798) disclose a technique that the reinforcing fibers, thermoplastic resin particles and thermal expandable particles are dispersed into water added with a coagulating agent and a thickening agent and filtered in the paper making. The above coagulating agent is added for the purpose of coagulating the thermal expandable particles to prevent the thermal expandable particles from discharging through meshes of a paper-making screen in the paper making. However, the stampable sheet obtained by this technique has a problem that since the thermal expandable particles are coagulated, if it is heated to form an expanded product, only the coagulated portion is largely expanded to make the irregularity on the surface of the expansion molded product larger and hence the surface properties are deteriorated and the density of the coagulated portion in the thermal expandable particles is lowered to decrease the strength of the expansion molded product.

Further the above patent document 5 (JP-A-H02-045135) discloses a technique that a web subjected to a needling treatment is immersed into a solution dispersed with thermal expandable particles to uniformly disperse the thermal expandable particles into the web. In this technique, however, since the web is subjected to the needling treatment, there is caused a problem that needle traces also remain in the expansion molded product and buckling is caused about the needle trace to deteriorate the mechanical strength.

It is, therefore, an object of the invention to propose an expansion molded product of stampable sheet being light in the weight and having not only an excellent sound absorbing property but also excellent surface properties and mechanical strength, a web and a stampable sheet suitable for use in the production thereof as well as a method of producing the same.

The inventors have made various studies in order to solve the above problems of the conventional techniques. As a result, it has been found that the above problems can be solved by properly controlling the distribution of the thermal expandable particles included in the web in a thickness direction through foam-paper-making process.

That is, the thermal expandable particles are kept at the surfaces of the bubbles in the foam-paper-making process, so that the particles are uniformly dispersed in the foamy solution. In the foam-paper making process, the thermal expandable particles can be dispersed without coagulating. As a result, the irregularity due to the coagulation of the thermal expandable particles is hardly caused on the surface of the expansion molded product. In the foam-paper-making process, the reinforcing fibers having a diameter of several dozen μm and a length of several dozen mm and the thermoplastic resin particles having a diameter of about several hundreds μm can be uniformly dispersed into the web after the paper making in thickness and width directions. However, in case of the paper making of the foamy solution dispersed with the thermal expandable particles having a diameter of about several dozen μm, it has been confirmed to obtain a web wherein the thermal expandable particles are eccentrically located toward a side of a paper-making screen or a side of removing foam by suction and the thermal expandable particles are hardly existent at a side opposite thereto. This is considered due to the fact that since the particles are small, the thermal expandable particles are eccentrically located toward the side of the paper-making screen by the suction force for the removal of foam. When the web containing the thermal expandable particles eccentrically located toward the one face side is used to prepare a stampable sheet or when such a stampable sheet is used to prepare an expansion molded product, the distribution state of the thermal expandable particles in the web is inherited as it is. As a result, in the finally obtained expansion molded product, the face side having substantially no thermal expandable particles is larger in the specific gravity and higher in the density as compared with the face side having a great number of thermal expandable particles, so that the compression strength becomes higher and the bending strength is improved. Further, the expansion molded product having a high density layer existed at its surface more improves the sound absorbing property. The invention is based on the above knowledge.

That is, the invention is a web containing a thermoplastic resin, reinforcing fibers and thermal expandable particles dispersed therein and is characterized in that the thermal expandable particles are eccentrically located toward one-side surface of the web. Preferably, the web is a web produced by a foam-paper-making process (foam-paper-made web).

Also, the invention is a stampable sheet containing reinforcing fibers and thermal expandable particles dispersed into a matrix made of a thermoplastic resin and is characterized in that the thermal expandable particles are eccentrically located toward one-side surface of the stampable sheet. Preferably, the stampable sheet is a stampable sheet obtained by heating, pressing and cooling the foam-paper-made web (foam-paper-made stampable sheet).

Furthermore, the invention is an expansion molded product of a stampable sheet in which reinforcing fibers and expanded thermal expandable particles are adhered with a thermoplastic resin and dispersed therein and is characterized in that the expanded thermal expandable particles are eccentrically located toward one-side surface of the expansion molded product. Preferably, the expansion molded product of stampable sheet is an expansion molded product of stampable sheet obtained by heating, molding and cooling the foam-paper-made stampable sheet (expansion molded product of foam-paper-made stampable sheet).

In addition, the invention proposes a method of producing a web by uniformly dispersing reinforcing fibers, a thermoplastic resin and thermal expandable particles into a surfactant-containing aqueous medium including fine foams therein to prepare a foamy solution and filtering the foamy solution, characterized in that the thermal expandable particles are eccentrically located toward one-side surface of the web by removing foams by suction during the filtering.

And also, the invention is a method of producing a stampable sheet by uniformly dispersing reinforcing fibers, a thermoplastic resin and thermal expandable particles into a surfactant-containing aqueous medium including fine foams therein to prepare a foamy solution, filtering the foamy solution to form a web, and then beating, pressing and cooling the web to prepare a stampable sheet in which the reinforcing fibers and thermal expandable particles are dispersed into a matrix made of the thermoplastic resin, characterized in that the thermal expandable particles are eccentrically located toward one-side surface of the stampable sheet by removing foams by suction during the filtering and eccentrically locating the thermal expandable particles toward one-side surface of the web.

Moreover, the invention is a method of producing an expansion molded product of a stampable sheet by uniformly dispersing reinforcing fibers, a thermoplastic resin and thermal expandable particles into a surfactant-containing aqueous medium including fine foams therein to prepare a foamy solution, filtering the foamy solution to form a web, and then heating, pressing and cooling the web to prepare a stampable sheet, and thereafter heating the stampable sheet to expand the thermal expandable particles and shaping and cooling to prepare an expansion molded product of the stampable sheet in which the reinforcing fibers and the expanded thermal expandable particles are adhered with the thermoplastic resin and dispersed thereinto, characterized in that the expanded thermal expandable particles are eccentrically located toward one-side surface of the expansion molded product of the stampable sheet by removing foam by suction during the filtering and eccentrically locating the thermal expandable particles toward one-side surface of the web.

According to the invention, the expansion molded product of stampable sheet which is not only light and good in the surface property, but also good in the mechanical strength such as the bending strength and rigidity.

BRIEF DESCRIPTION OF THE DRAWING

FIG. 1 is a graph showing a comparison of expansion molded products of stampable sheet on sound absorbing property.

BEST MODE FOR CARRYING OUT THE INVENTION

The invention has a characteristic that in the production of the expansion molded product of stampable sheet, a web as a starting material is prepared by using a foam-paper-making process so as to eccentrically locate thermal expandable particles included in the web at one-side surface, whereby a porosity at the side containing a great number of the thermal expandable particles is made larger and a porosity at the other side surface containing a few of the thermal expandable particles is made smaller to increase the density, whereby the expanding property as a whole is enhanced but also the mechanical strength and sound absorbing property of the expansion molded product are improved and the surface property is also improved. The construction of the invention will be described in detail below.

At first, the structures of the web, stampable sheet and expansion molded product of stampable sheet (hereinafter also referred to "expansion molded product" simply) according to the invention will be described below.

The web of the invention consists of reinforcing fibers, a thermoplastic resin and thermal expandable particles and is produced by a foam-paper-making process mentioned later and has a structure that the reinforcing fibers and thermoplastic resin are distributed at an approximately equal ratio in the thickness direction of the web but the thermal expandable particles are eccentrically located at one-side surface of the web. That is, the great number of the thermal expandable particles are existent in the vicinity of the one-side surface of the web, and the number of the particles is decreased toward the inside of the web, and hence the thermal expandable particles are hardly existent in the vicinity of the opposite surface.

The stampable sheet according to the invention, which is obtained by heating, pressing and cooling the above web, has a structure that the matrix is constituted with the thermoplastic resin melted and solidified by the heating and cooling and the reinforcing fibers and thermal expandable particles are dispersed into the matrix. In the stampable sheet according to the invention, the distribution state of the thermal expandable particles in the web is inherited as it is, so that the thermal expandable particles in the stampable sheet show a distribution that they are existent in the vicinity of the one-side surface of the sheet and are gradually decreased toward the inside thereof and are hardly existent in the vicinity of the opposite surface.

Similarly, in the expansion molded product obtained by expanding and shaping the above stampable sheet, the distribution state of the thermal expandable particles in the web is inherited as it is. That is, the expansion molded product according to the invention has a porous structure that the reinforcing fibers and the expanded thermal expandable particles are adhered with each other by the melted and solidified thermoplastic resin and dispersed thereinto, wherein the great number of the thermal expandable particles are existent in the vicinity of the one-side surface of the expansion molded product, and the number of the particles is decreased toward the inside of the expansion molded product, and hence the thermal expandable particles are hardly existent in the vicinity of the opposite surface. As a result, in the expansion molded product of the invention, the side of the surface having less thermal expandable particles is smooth in the surface and large in the specific gravity and high in the density as compared with the side containing the great number of the thermal expandable particles, so that the mechanical properties such as bending strength, stiffness and the like are improved and also the sound absorbing property becomes excellent.

Then, there will be described the reinforcing fiber, thermoplastic resin and thermal expandable particles constituting the web, stampable sheet and expansion molded product according to the invention.

As the reinforcing fibers used in the invention may be used inorganic fibers, organic fibers or a composite or mixed fibers thereof. As the fiber capable of being used may be mentioned inorganic fibers such as glass fiber, carbon fiber, boron fiber, stainless fiber and other metal fiber and mineral fiber; and organic fibers such as aramid fiber, polyester fiber, polyamide fiber, natural fiber of hemp and the like. Also, these fibers may be used alone or in a combination of two or more. Moreover, from a viewpoint that a high reinforcing effect is given to the expansion molded product, the inorganic fibers are preferable rather than the organic fibers, and among them the use of carbon fiber is preferable in view of the importance on the strength. On the other hand, the glass fiber is preferable in view of the cost, while the organic fibers are preferable from a viewpoint of the thermal recycle that residues are not retained even in the burning.

The reinforcing fiber is preferable to have an average diameter of 3-50 µmφ from a viewpoint of sufficiently ensuring the reinforcing effect and expansion property of the stampable sheet. More preferably, the average diameter is 3-30 µmφ. By using the reinforcing fibers having the above range of the average diameter, the yield of the thermal expandable particles in the machining can be improved. Moreover, if it is expected to increase the expansion quantity by the synergistic effect of the spring back of the reinforcing fibers and the expansion property of the thermal expandable particles, a mixture of reinforcing fibers having an average diameter of 100-1000 µmφ and reinforcing fibers serving to fill in gaps between the fibers and having an average diameter of 3-50 µmφ may be used. Also, the average length of the reinforcing fibers is preferably a range of 3-100 mm in view that the reinforcing effect, expansion property and shapability are ensured sufficiently. Furthermore, the average length of the reinforcing fibers is more preferably a range of 3-50 mm from a viewpoint that the thermoplastic resin and the reinforcing fibers are more uniformly dispersed at a pre-stage of the step of making the web. Moreover, the above average diameter and average length are average of values obtained by measuring about 50 diameters and lengths of reinforcing fibers before using or reinforcing fibers in the web, expansion molded product of stampable sheet with a microscope or the like. Further, the reinforcing fibers may be observed by means of a microscope or the like after the web, stampable sheet or expansion molded product is fired at a temperature of about 600° C.

The reinforcing fibers used in the invention are preferably subjected to a surface treatment with a coupling agent or sizing agent. Particularly, they are preferably subjected to a treatment with a silane coupling agent in order to improve the wettability or adhesiveness between the reinforcing fibers and the thermoplastic resin. As the silane coupling agent, vinylsilane-based, aminosilane-based, epoxysilane-based, methacrylsilane-based, chlorosilane-based, mercaptosilane-based coupling agents and the like may be used. The surface treatment of the reinforcing fibers with the silane coupling agent may be carried out by a well-known method such as a method of spraying a solution of a silane coupling agent while stirring the reinforcing fibers, a method of immersing the reinforcing fibers into a solution of a silane coupling agent, or the like. Moreover, the amount of the silane coupling agent treated is preferably 0.001-0.3 mass % based on the mass of the reinforcing fibers to be treated. When it is less than 0.001 mass %, the effect of the silane coupling agent is small and the sufficient adhesion strength between the reinforcing fibers and the thermoplastic resin is not obtained, while when it exceeds 0.3 mass %, the effect of the silane coupling agent is saturated. More preferably, it is a range of 0.005-0.2 mass %.

Also, the reinforcing fibers used in the invention are desirably fibrillated into monofilaments for enhancing the strength and expansion property of the stampable sheet. For this end, the reinforcing fibers are preferably treated with water-soluble sizing agent. As the sizing agent, polyethylene oxide-based and polyvinyl alcohol-based water-soluble resins and the like may be used. The amount of the greige goods treated is desirably not more than 2 mass %, preferably not more than 1 mass % based on the mass of the reinforcing fibers to be treated. When it exceeds 2 mass %, the fibrillation of the fibers in the machining step becomes difficult. Moreover, the lower limit of the amount treated is about 0.05 mass %. When the amount treated is too small, the handling property becomes poor.

There will be described the thermoplastic resin used in the invention below.

As the thermoplastic resin used in the invention, for example, a polyolefin resin such as polyethylene, polypropylene or the like; polystyrene, polyvinyl chloride, polyethylene terephthalate, polycarbonate, polyamide, polyacetal and so on, or one or more thermoplastic elastomers such as ethylene-vinyl chloride copolymer, ethylene-vinyl acetate copolymer, styrene-butadiene-acrylonitrile copolymer, EPM, EPDM and the like may be used. Among them, the polyolefin resin such as polyethylene, polypropylene or the like is preferable in a point that the strength, stiffness and shapability are excellent, and particularly polypropylene is preferable because the balance of the above properties is excellent and the cost is low. Further, MFR (melt flow rate, at 230° C. and 21.17N) measured under conditions defined in JIS K6921-2:1997 among polypropylene is preferably a range of 1-200 g/10 min., more preferably a range of 10-150 g/10 min.

In order to enhance the adhesiveness of the thermoplastic resin to the reinforcing fibers, non-modified thermoplastic resin may be used together with a thermoplastic resin modified with an acid as unsaturated carboxylic acid or unsaturated carboxylic acid anhydride, or various compounds such as epoxy compound and so on. The modification treatment may be carried out, for example, by graft-copolymerizing polypropylene with maleic acid, anhydrous maleic acid, acrylic acid or the like. The modified resin preferably has a modifying group such as acid anhydride group, carboxyl group or the like in its molecule from a viewpoint of the strength improvement.

As the form of the thermoplastic resin, granular form such as powder, pellet, flake or the like, and fibrous form may be used. It is preferable to use the fibrous form with the granular form from a viewpoint that the handling property of the web and the yield of the thermal expandable particles are improved and that the melted thermoplastic resin and the reinforcing fibers are sufficiently entangled to improve the strength and stiffness in the production of the stampable sheet. In case of using the granular form, it is preferable to use particles having an average particle size of 100-2000 µmϕ, and the average particle size is more preferably 100-1000 µmϕ from a viewpoint of uniformly dispersing into the stampable sheet. On the other hand, when the granular form is used together with the fibrous form, it is preferable to use fibers having an average diameter of 1-50 µmϕ and an average length of 1-50 mm. The average length is more preferably 1-30 mm from a viewpoint of uniformly dispersing in the foamy solution.

Next, there will be described the thermal expandable particles used in the invention.

The thermal expandable particles used in the invention have a property that when they are heated above a certain temperature, the softened shell expands through a pressure of vaporization expanding core. The invention has a great characteristic that the thermal expandable particles are used as a material constituting the web, expansion molded product of stampable sheet thereof. By using the thermal expandable particles, a larger expansion amount can be ensured than that in the case of the spring back of the reinforcing fibers alone, so that the density can be more reduced and that the expansion molded product being light in the weight and having stiffness can be obtained.

In the invention well-known thermal expandable particles can be used, but particularly preferably core-shell type thermal expandable particles may be used in which the core is a liquid hydrocarbon and is enclosed with a thermoplastic resin having a gas barrier property. Generally, the hydrocarbon used in the core has a boiling point lower than a softening point of the thermoplastic resin as a shell, and may include, for example, hydrocarbons having a boiling point of not higher than 150° C. such as isobutane, pentane, hexane and the like or ethers. As the thermoplastic resin forming the shell, well-known thermoplastic resins, for example, polyolefin resin such as polyethylene, polypropylene, ethylene-propylene copolymer and the like; polystyrene, polyvinyl chloride, polyvinylidene chloride, methacrylic resin, ABS resin, ethylene-vinyl acetate copolymer, polyamide resin, polyethylene terephthalate, polybutylene terephthalate, polyurethane, polyacetal, polyphenylene sulfide, fluorine resin and the like may be mentioned. Particularly, thermal expandable particles in which the core is made of a liquid hydrocarbon such as isobutane, pentane, hexane or the like and the shell is made of a thermoplastic resin such as acrylonitrile copolymer, polyvinylidene chloride or the like are preferable.

The average diameter of the thermal expandable particles is preferably 5-200 µmϕ, more preferably not less than 10 µmϕ but less than 100 µmϕ, further preferably not less than 20 µmϕ but less than 100 µmϕ before the expansion under heating. When the particle diameter before the expansion is less than 5 µmϕ, the particles pass through the gap between the reinforcing fibers in the machining and are easily dropped off to lower the yield. On the other hand, when it exceeds 200 µmϕ, the size of the thermal expandable particles after the expansion is too large and hence the thickness of the expansion molded product becomes non-uniform or the surface quality is deteriorated. Moreover, the average diameter of the thermal expandable particles after the expansion is preferably 10-2000 µmϕ, more preferably 20-1000 µmϕ. As the average diameter of the thermal expandable particles after the expansion becomes too small, the amount (number) of the thermal expandable particles required in the expansion of the stampable sheet becomes large. On the other hand, as the average diameter after the expansion becomes too large, the irregularity is generated on the surface of the expansion molded product to deteriorate the surface property. Moreover, the average diameter of the thermal expandable particles after the expansion is an average of values obtained by about 50 diameters of thermal expandable particles in the expansion molded product by means of an optical microscope or the like.

As mentioned above, when the thermal expandable particles are heated above a certain temperature, the softened shell starts the expansion through a pressure of vaporization-expanding core. In the invention, such a temperature is called as an "expansion starting temperature" and is defined by a temperature that the particle size of the thermal expandable particles starts to be rapidly increased when the thermal expandable particles are heated at 10° C./min. The expansion starting temperature of the thermal expandable particles used in the invention is preferably not lower than 120° C., more preferably 130-230° C. When the expansion starting temperature is lower than 120° C., the heat resistance of the thermal expandable particles themselves is poor and also it is necessary to extremely lower the drying temperature of the machined web and hence the drying is required to take a long time, which is not desirable. On the other hand, when the expansion starting temperature exceeds 230° C., the heating temperature for the expansion is too high and there is a possibility of deteriorating the thermoplastic resin.

The expansion starting temperature of the thermal expandable particles is preferably small in the difference to the melting point of the thermoplastic resin constituting the matrix. When the expansion starting temperature of the thermal expandable particles is too lower than the melting point of the thermoplastic resin, the thermoplastic resin is melted and flown around the reinforcing fibers and hence the thermal expandable particles are excessively expanded before the adhesion, which is not desirable. On the other hand, when the expansion starting temperature is too high, it is required to heat the particles to a higher temperature for obtaining the sufficient expanded thickness and hence there is a possibility of deteriorating the thermoplastic resin. Therefore, the difference between the expansion starting temperature of the thermal expandable particles and the melting point of the thermoplastic resin constituting the matrix is preferably within ±30° C.

Also, in the thermal expandable particles, the maximum expansion temperature is preferably higher than the melting point of the thermoplastic resin, and the temperature difference thereof is preferably within 50° C. The maximum expansion temperature used herein means a temperature that the particle size of the thermal expandable particles becomes maximum when the thermal expandable particles are heated at 10° C./min. If the maximum expansion temperature is higher than the melting point of the thermoplastic resin, it is necessary to heat the particles to a higher temperature for obtaining the sufficient expansion property, which causes a fear of deteriorating the thermoplastic resin.

Next, there will be described the weight of the web and the compounding ratio of the reinforcing fibers, thermoplastic resin and thermal expandable particles constituting the web, stampable sheet and expansion molded product.

At first, the weight of the web or the like according to the invention is preferably a range of 100-1000 g/m$^2$. When the weight of the web is less than 100 g/m$^2$, the sufficient thickness as the expansion molded product is not obtained and also the stiffness lowers, while when it exceeds 1000 g/m$^2$, it is difficult to reduce the weight of the expansion molded product. It is more preferably a range of 100-700 g/m$^2$, further preferably 100-500 g/m$^2$.

Next, the compounding ratio of the reinforcing fibers to the thermoplastic resin constituting the web or the like according to the invention differs in accordance with the specific gravities of the reinforcing fiber and thermoplastic resin used and contents of other additives and coloring agent, but it is preferable that the reinforcing fibers/thermoplastic resin as a mass ratio is within a range of 3/97-60/30 in order to obtain an expansion molded product having high mechanical strengths such as flexural strength (buckling strength), flexural modulus (elastic slope) and the like.

Also, the content of the thermal expandable particles constituting the web or the like according to the invention is preferably 1-40 parts by mass based on 100 parts by mass of a total of the reinforcing fibers and thermoplastic resin. When the content is less than 1 part by mass, the effect of improving the expansion property is not developed, while when it exceeds 40 parts by mass, the effect of improving the expansion property becomes too large, which decreases the density in not only the interior of the expansion molded product but also the surface layer, and lowers the stiffness and buckling resistance.

Moreover, the web or the like according to the invention may contain additives, such as antioxidant, light-resisting stabilizer, metal inactivating agent, flame retardant, carbon black, VOC absorber, VOC decomposer, deodorant and the like, a coloring agent, an organic binder and so on, if necessary, in addition to the above thermoplastic resin, reinforcing fibers and thermal expandable particles. The additives and coloring agent may be included by coating onto the reinforcing fibers or thermoplastic resin in advance, or by compounding during the mixing, or by spraying onto the web through a sprayer.

The production method of the web, stampable sheet and expansion molded product according to the invention will be described below.

The production method of the web according to the invention lies in that the reinforcing fibers, thermoplastic resin and thermal expandable particles are dispersed into a surfactant containing aqueous medium containing fine foams as a dispersing solution to prepare a foamy solution and the resulting foamy solution is filtered. If the above starting materials are mixed and dispersed in water containing no thickener or coagulating agent instead of the foamy solution, since the specific gravities of the reinforcing fiber, thermoplastic resin and thermal expandable particle are different from each other, the starting materials are separated during the mixing to render into a non-uniformly dispersed state, or thermal expandable particles having a small particle size pass through the web in the dehydration to lower the yield. Moreover, when the thermal expandable particles are mixed and dispersed in water containing a thickener or a coagulating agent, they are aggregated as previously mentioned. On the contrary, when the foamy solution is used, the reinforcing fibers, thermoplastic resin and thermal expandable particles are maintained at the surface of the foam and uniformly dispersed into the foamy solution, so that the separation is not caused in the transportation of the dispersing solution.

The production of the web according to the invention is carried out by pouring the dispersion (foamy solution) containing the reinforcing fibers, thermoplastic resin and thermal expandable particles in a porous support such as a paper-making screen and suctioning from the downside of the porous support to remove the foam to thereby deposit the solid content in the dispersion onto the porous support. When the thermoplastic resin is granular form such as powder pellet or flake, the thermoplastic resin and thermal expandable particles are filtered through the filter effect of the reinforcing fibers and hence they retain in the web. At this moment, the particle size of the thermal expandable particles is smaller than that of the thermoplastic resin, so that the thermal expandable particles are easily eccentrically located toward the side of the porous support. That is, there is obtained a web wherein a great number of the thermal expandable particles are existent in the vicinity of the surface of the porous support and the number of the thermal expandable particles decreases from the surface toward the interior and finally the thermal expandable particles are not substantially existent in the vicinity of the surface of the opposite side.

As the surfactant used in the foam-paper-making process any of anionic, nonionic and cationic ones may be used. Particularly, sodium dodecylbenzene sulfonate, coconut oil fatty acid diethanol amine and the like are preferably used in view of an excellent effect that the starting material consisting of the reinforcing fibers and thermoplastic resin is uniformly dispersed into the medium.

The web obtained by the above foam-paper-making is dried under a condition that the thermal expandable particles are not expanded at maximum (temperature and time). That is, if the thermal expandable particles in the web are expanded at maximum at the drying stage, the handling property of the web is deteriorated but also the thermal expandable particles are collapsed under compression in the production of the stampable sheet, and there is a case that the expansion property of the stampable sheet is insufficient in the subsequent production of the expansion molded product.

In order to expand the thermal expandable particles at maximum, a certain heat quantity is required. Therefore, in order that the thermal expandable particles are not expanded at maximum, it is required to control the heating temperature and time so that the heat quantity charged in the drying is less than the above certain heat quantity. Concretely, the heating temperature for the drying is not higher than 30° C. from the maximum expansion temperature, and the heating time is preferably within {2×(maximum expansion temperature−expansion start temperature)} when the heating temperature is not higher than the maximum expansion temperature, while the heating time is preferably within {300/(heating temperature−maximum expansion temperature)} and {2×(maximum expansion temperature−expansion start temperature)} when the heating temperature is higher than the maximum expansion temperature.

Moreover, when an emulsion or aqueous solution containing an organic binder is immersed in the foam-paper made web by applying through spraying or a roll coater and suctioning from an opposite face side under vacuum, the reinforcing fibers, thermoplastic resin and thermal expandable particles are efficiently adhered to the web in the drying, so that the yield is improved but also the handling property is improved and the production efficiency is also improved.

Next, the production method of the stampable sheet according to the invention will be described.

The stampable sheet according to the invention is produced by heating the web obtained through the above foam paper making at a temperature higher than the softening point or melting point of the thermoplastic resin and under a condition that the thermal expandable particles are not expanded at maximum (temperature and time), pressurizing, cooling and solidifying, whereby the thermoplastic resin is melted to form as matrix and the dispersed reinforcing fibers and thermal expandable particles are sufficiently adhered and bonded through the melted and solidified thermoplastic resin. The term "condition not causing the maximum expansion (temperature and time)" used herein is the same as in the aforementioned condition. The reason why the temperature is higher than the melting point of the thermoplastic resin is due to the fact that when it is lower than the melting point, the thermoplastic resin is not sufficiently fused to the reinforcing fibers and thermal expanding particles and hence the required strength is not obtained, while the reason why the thermal expandable particles are heated under the condition causing no maximum expansion is due to the fact that if the thermal expandable particles are expanded at maximum at the heating step, the handling property of the stampable sheet is lowered but also the thermal expandable particles are collapsed under compression in the production of the stampable sheet and there could be a case that the expansion property required for the subsequent production of the expansion molded product is not obtained.

As the pressing condition when the web is heated to melt the thermoplastic resin and pressed to produce the stampable sheet, it is preferable to compress the web so as to render the specific gravity of the stampable sheet into not less than 0.3. When it is less than 0.3, the fluidity of the thermoplastic resin is insufficient and the structure of dispersing the reinforcing fibers and thermal expandable particles into the thermoplastic resin as a matrix may not be formed. More preferably, the specific gravity is not less than 0.4. However, as the web is extremely compressed, there is a possibility that the reinforcing fibers are broken or the sheet weight is decreased (the sheet area becomes large to thin the thickness), so that it is preferable to conduct the compression at a pressure that the porosity is not more than zero.

In the production method of the stampable sheet according to the invention, the pressing of the web may be conducted after the melting of the thermoplastic resin or the heating and the pressing may be conducted simultaneously. As the pressing method, there are an intermittent pressing method of batch system, a continuous pressing method using a belt of teflon or steel, a roll pressing method and the like, and any of them may be used. In order to improve the handling property of the stampable sheet, the pressing is carried out during the melting of the thermoplastic resin, and thereafter the pressure is removed to conduct the expansion, and the cooling may be conducted at a state of thickness thicker than that in the pressing. Further, there is a method wherein the drying and heating of the web are simultaneously carried out and subsequently the pressing is conducted, which is economical and good in the production efficiency.

The production method of the expansion molded product according to the invention will be described below.

The expansion molded product according to the invention is produced by heating the thus produced stampable sheet above the softening temperature or melting point of the thermoplastic resin and the expansion start temperature of the thermal expandable particles to soften or melt the thermoplastic resin and at the same time expand the thermal expandable particles and thereafter placing the expanded sheet in a mold and closing the mold and adjusting a clearance of the mold to conduct the shaping and then cooling and solidifying the sheet.

The specific gravity of the expansion molded product is preferably not less than 0.03 but not more than 0.2 as a whole. When the specific gravity is less than 0.03, there could be a case that the buckling resistance of the expansion molded product is deteriorated, while when it exceeds 0.2, it is required to increase the thickness for obtaining the required stiffness and there could be a case that the weight reduction may not be attained. Also, in addition that the specific gravity of the expansion molded product according to the invention is not more than 0.2 as a whole, it is preferable to form an outer peripheral portion having a specific gravity of more than 0.2 there around. Since the outer peripheral portion having a specific gravity of not less than 0.2 is formed, the dropout of the thermal expandable particles can be prevented but also the tear strength is improved and hence the whole of the product is hardly folded.

Furthermore, when the expanded sheet is supplied into the mold, a surface skin material having a good design is laminated to a side of a face holding almost none of thermal expandable particles and adhered thereto together with the expansion shaping, whereby there can be obtained the expansion molded product attached with the surface skin according to the invention.

In order to improve the strength characteristics such as buckling resistance, stiffness and the like, and sound absorption property of the expansion molded product further according to the invention, a high density resin layer may be formed on at least one surface of the expansion molded product. The high density resin layer means a resin layer having a porosity smaller than that in an inner layer portion of the expansion molded product or having no pore.

As the method of forming the high density resin layer, the conventionally known techniques may be used. For example, a method wherein a solution containing a resin for the formation of the high density resin layer is impregnated into at least one surface of the web, stampable sheet or expansion molded product, a method wherein a melted high density resin is extruded in the form of a sheet and laminated, a method wherein a high density resin sheet is laminated and so on are preferable. Among them, the method of laminating the resin sheet is preferable because the lamination is easy for any of the web, stampable sheet and expansion molded product. The thickness of the resin sheet is preferably not more than 200 μm, more preferably 20-150 μm for suppressing the increase of the weight. Here, the resin sheet may be a sheet made of polypropylene, nylon or linear polyethylene, or a multilayer film formed by laminating two or more of such sheets. Also, the above sheet may be provided with through-holes formed by needle punching, slits or the like for providing the sound absorption property.

Example 1

As a dispersion, to 1.5 liter of water is added 0.5 g/l of sodium dodecylbenzene sulfonate as a surfactant, which is stirred to prepare a foamy solution containing fine bubbles, and into the resulting foamy solution are charged reinforcing fibers (carbon fibers, average diameter: 7 μm, average length: 13 μm) and thermoplastic resin (granular polypropylene, average particle size: 300 μmφ) shown in Table 1 at a compounding ratio by dry mass shown in Table 2, and further thermal expandable particles are charged and stirred and dispersed for 10 minutes. Then, the foamy solution is poured into a paper machine, vacuumed and removed the foam to prepare a web having a total weight of reinforcing fibers and thermoplastic resin of 400 g/m² and a weight of thermal expandable particles of 30 g/m² (foam-paper-made web). Moreover, a porous support having an opening hole of 0.1×0.2 mm is used in the machining.

As the section of the web is observed by means of a microscope, the reinforcing fibers and thermoplastic resin and thermal expandable particles are dispersed, while a great number of the thermal expandable particles are existent in the vicinity of the web surface located at the side of the porous support and decrease toward the inside of the web and the thermal expandable particle is hardly existent in the web surface opposite to the side of the porous support.

Then, the thus prepared web is dried at a temperature of 120° C. for 90 minutes and placed between press boards of 180° C. and pressed under a pressure of 0.1 MPa for 2 minutes so as not to expand the thermal expandable particles at maximum. In this case, a clearance between the press boards is 1 mm and the web is compressed to a specific gravity of 0.43. Subsequently, the heated and pressed web is placed between cooling boards and cooled at a clearance between the cooling boards of 3 mm to prepare a stampable sheet (foam-paper-made stampable sheet).

As the section of the stampable sheet is observed by means of a microscope, it shows a structure that the reinforcing fibers and thermal expandable particles are dispersed in the matrix made of the thermoplastic resin, but the thermal expandable particles are substantially existent in the vicinity of the surface located at the side of the porous support and gradually decrease toward the inside thereof and are hardly existent in the vicinity of the surface located at the opposite side likewise the web.

Next, the stampable sheet is heated to 190° C. in a far-infrared oven to melt the thermoplastic resin (polypropylene) and expand the thermal expandable particles, and thereafter placed on a mold set to a clearance of 5 mm and compressed and cooled to prepare an expansion molded product.

As the section of the expansion molded product is observed by means of a microscope, it shows a structure that the reinforcing fibers and expanded thermal expandable particles are adhered and dispersed with the thermoplastic resin, but the thermal expandable particles are substantially existent in the vicinity of the surface of the expansion molded product located at the side of the porous support and gradually decrease toward the inside thereof and are hardly existent in the vicinity of the surface located at the opposite side likewise the web and stampable sheet.

Separately, the stampable sheet is heated to a temperature of 190° C. in a far-infrared oven and expanded at a non-restrain state and cooled in air to prepare an expanded sheet, and as the both surfaces of the expanded sheet are observed, both the surfaces have no irregularity and are smooth. The thickness of the expanded sheet is 10.4 mm.

Then, a test piece having a length of 150 mm and a width of 50 mm is taken out from the expansion molded product and subjected to a three-point flexural test at a span of 100 mm and a crosshead speed of 50 mm/min under a load applied to a side of face having small thermal expandable particles or a side of a high density face to measure a maximum load until buckling and an elastic slope determined from an initial gradient of a load-displacement curve.

Further, the measurement of an absorption ratio of vertically incident sound at a state of a back air layer of 0 mm is carried out by vertically incoming a sound wave to a side of a face having small thermal expandable particles or a side of a high density face according to JIS A1405:1998.

TABLE 1

| Term | Reinforcing fibers | Thermoplastic resin | | Thermal expandable particles |
|---|---|---|---|---|
| Component | carbon fiber (PAN base) | polypropylene | | core portion: hydrocarbon shell portion: acrylonitrile copolymer |
| Shape | fibrous | Granular | fibrous | granular |
| Size | average diameter: 7 μmφ average length: 13 mm or 40 mm | average particle size: 300 μmφ | average diameter: 17 μmφ average length: 20 mm | average particle size: 70 μmφ |
| Physical property | — | melting point: 165° C. MFR: 120 g/10 min. | melting point: 165° C. | expansion starting temperature: 155° C. maximum expansion temperature: 175° C. |
| Maker | Toho Tenax Co., Ltd. | Sumitomo Chemical Industry Co., Ltd. | Daiwabou Co., ltd. | Kureha Co., Ltd. |

TABLE 2

| | Materials of web | | | | | Production conditions of stampable sheet | |
|---|---|---|---|---|---|---|---|
| Example | Reinforcing fibers and thermoplastic resin | Compounding ratio (mass %) | Thermal expandable particles (g/m²) | Web drying temperature (° C.) | Film laminated on web surface (high-density resin layer) | Web heating temperature (° C.) | Clearance of heating press (mm) |
| 1 | carbon fiber granular polypropylene | 25 75 | 30 | 120 | — | 180 | 1.0 |

TABLE 2-continued

| | | | | | | | |
|---|---|---|---|---|---|---|---|
| 2 | carbon fiber<br>granular polypropylene | 25<br>75 | 30 | 120 | PP40/PA25<br>LLDPE50/PP40 | 180 | 1.2 |
| 3 | carbon fiber<br>granular polypropylene | 25<br>75 | 30 | 120 | PP40/PA25<br>LLDPE50/PP40 | 180 | 1.2 |
| 4 | carbon fiber<br>granular polypropylene | 25<br>75 | 30 | 120 | — | 180 | 1.0 |
| 5 | carbon fiber<br>fibrous polypropylene | 40<br>60 | 30 | 120 | PP40/PA25<br>LLDPE50/PP40 | 180 | 1.2 |

| | Properties of expanded sheet expanded at non-restraint state | | Properties of expansion molded product | | | |
|---|---|---|---|---|---|---|
| Example | Expanded thickness (mm) | Surface property | Thickness (mm) | Maximum load (N) | Elastic slope (N/cm) | Remarks |
| 1 | 10.4 | both smooth surfaces | 5.0 | 12 | 51 | Invention |
| 2 | 10.6 | both smooth surfaces | 6.0 | 18 | 67 | Invention |
| 3 | — | — | 8.0 | 17 | 70 | Invention |
| 4 | 9.2 | both irregular surfaces | 5.0 | 6 | 30 | Comparative |
| 5 | 4.8 | presence of needle traces | 4.8 | 4 | 21 | Comparative |

Example 2

The web prepared in Example 1 is heated at 180° C. for 5 minutes so as not to expand the thermal expandable particles at maximum to thereby melt the thermoplastic resin, and thereafter a polypropylene/nylon two-layer film (polypropylene (PP): thickness 40 μm, melting point 165° C., MFR 8 g/10 min, nylon (PA): thickness 25 μm, melting point 220° C.) is laminated onto a side of a face of the porous support in the web so as to face the polypropylene to the web side and a linear polyethylene/polypropylene two-layer film having holes of 1 mmφ in diameter formed at 5 holes/cm² by needle punching over a full face (linear polyethylene (LLDPE): thickness 50 μm, melting point 120° C., MFR 8 g/10 min., polypropylene: thickness 40 μm, melting point 165° C., MFR 8 g/10 min.) is laminated onto the other face of the web so as to face the polypropylene to the web side, and then they are compressed by passing between rolls having a clearance of 1.2 mm to prepare a stampable sheet having a specific gravity of 0.36. Moreover, MFR of PP is a value measured under conditions of 230° C. and 21.17 N according to JIS K6921-2:1997, and MFR of LLDPE is a value measured under conditions of 190° C. and 21.17 N according to JIS K6922-2:1997.

As the section of the stampable sheet is observed by means of a microscope, the (high density) resin layers are existent on both surfaces of the stampable sheet and the interior of the resin layer has a structure that the reinforcing fibers and thermal expandable particles are dispersed into the matrix made of the thermoplastic resin, but the thermal expandable particles are substantially existent at the side of the porous support and are hardly existent at the opposite side.

Also, the stampable sheet is heated to 190° C. in a far-infrared oven and expanded at a non-restraint state and cooled in air to prepare an expanded sheet, and hence both surfaces of the expanded sheet have no irregularity and are smooth. The thickness of the expanded sheet is 10.6 mm.

Then, the thus obtained stampable sheet is heated to 190° C. in a far-infrared oven and formed in a mold set to a clearance of 6 mm to obtain an expansion molded product.

As the section of the expansion molded product is observed by means of a microscope, the (high density) resin layers are existent on both surfaces of the expansion molded product and the interior of the resin layer has a structure that the reinforcing fibers and the expanded thermal expandable particles are dispersed into the matrix made of the thermoplastic resin, but the thermal expandable particles are substantially existent at the side of the porous support and are hardly existent at the opposite side.

With respect to the expansion molded product, the three-point flecural test and the measurement of absorption ratio of vertically incident sound are carried out in the same manner as in Example 1.

Example 3

The stampable sheet prepared in Example 2 is heated to 190° C. and expanded in a far-infrared oven and further a polyester non-woven fabric (weight: 200 g/m², thickness: 2 mm) as a surface skin is laminated onto a side of a face laminated with the linear polyethylene (LLDPE) film (side opposite to the porous support), and thereafter the expansion molding is carried out in a mold set to a clearance of 8 mm to obtain an expansion molded product provided with the surface skin.

As the surface skin is peeled off from the expansion molded product by hand, the breakage is caused at the surface skin portion and it has been confirmed that the surface skin is adhered sufficiently.

As the section of the expansion molded product is observed by means of a microscope, the (high density) resin layer is existent on the surface of the expansion molded product located at the side of the porous support and the surface skin layer and the (high density) resin layer are existent at the opposite surface side and the interior of the resin layer has a structure that the reinforcing fibers and the expanded thermal expandable particles are dispersed into the matrix made of the thermoplastic resin, but the thermal expandable particles are substantially existent at the side of the porous support and are hardly existent at the opposite side.

With respect to the expansion molded product, the three-point flexural test and the measurement of absorption ratio of vertically incident sound are further carried out in the same manner as in Example 1.

Example 4

As a comparative example, instead of the foamy solution used in Example 1, an aqueous solution containing no fine bubble obtained by adding 10 g of 0.5 mass % polyacrylamide as a coagulating agent and 0.05 g of xthansan gum as a thickener to 1.5 liter of water is used as a dispersion, and carbon fibers and polypropylene are charged into the dispersion at a compounding ratio shown in Table 2 and further thermal expandable particles are charged, from which a web having a total weight of 400 g/m$^2$ and a weight of thermal expandable particles of 30 g/m$^2$ is prepared in the same manner as in Example 1.

As the section of the web is observed by means of a microscope, the reinforcing fibers are dispersed uniformly, but the thermal expandable particles are aggregated to form flocks and these flocks are uniformly dispersed in the thickness direction.

Next, a stampable sheet and an expansion molded product are prepared by using the web in the same manner as in Example 1, and the three-point flexural test and measurement of absorption ratio of vertically incident sound are carried out in the same manner as in Example 1.

Also, as the sections of the stampable sheet and the expansion molded product are observed by means of a microscope, the thermal expandable particles are aggregated to form flocks and these flocks are uniformly dispersed in the thickness direction likewise the web.

Furthermore, the stampable sheet is heated to 190° C. in a far-infrared oven, expanded at a non-restraint state and cooled in air to prepare an expanded sheet. Both surfaces of the expanded sheets are large in the irregularity because the thermal expandable particles are aggregated. Also, the thickness of the expanded sheet is only 9.2.mm.

Example 5

As a comparative example, reinforcing fibers (carbon fibers, average diameter 7 μm, average length 40 mm) and thermoplastic resin (fibrous polypropylene, average diameter 17 μm, average length 20 mm) are supplied to a card machine at a compounding ratio shown in Table 2, fibrillated and mixed and thereafter subjected to needling of 20 points/cm$^2$ with a needle punching machine (felt needle No. 25) to prepare a web of 400 g/m$^2$, and a sample of 300×300 mm is taken out from the web.

Then, the above web sample is immersed in a solution having a solid concentration of acrylstyrene emulsion of 1 mass % and containing 20 mass % of thermal expandable particles and compressed through rolls to uniformly impregnate the thermal expandable particles into the interior thereof to thereby adjust 2.7 g of the thermal expandable particles to remain thereof. The web is dried at 120° C. to obtain a web comprising 160 g/m$^2$ of carbon fibers, 240 g/m$^2$ of fibrous polypropylene and 30 g/m$^2$ of thermal expandable particles.

As the section of the web is observed by means of a microscope, the carbon fibers, fibrous polypropylene and thermal expandable particles are uniformly dispersed in the thickness direction.

Then, the web is heated at 180° C. for 5 minutes to melt polypropylene, and thereafter a polypropylene/nylon two-layer film (polypropylene (PP): thickness 40 μm, melting point 165° C., MFR 8 g/10 min., nylon (PA): thickness 25 μm, melting point 220° C.) is laminated onto one-side face of the web so as to face the polypropylene to the web side and a linear polyethylene/polypropylene two-layer film having holes of 1=0 in diameter formed at 5 holes/cm$^2$ by needle punching over a full face (linear polyethylene (LLDPE): thickness 50 μm, melting point 120° C., MFR 8 g/10 min., polypropylene: thickness 40 μm, melting point 165° C., MFR 8 g/10 min.) is laminated onto the other face of the web so as to face the polypropylene to the web side in the same manner as in Example 2, and then they are compressed by passing between rolls having a clearance of 1.2 mm to prepare a stampable sheet having a specific gravity of 0.36.

Thereafter, the stampable sheet is heated to 190° C. in a far-infrared oven and then the expansion shaping is carried out by using a mold having a clearance of 6 mm. In the stampable sheet, however, the carbon fibers are strongly entangled with each other, so that the expansion amount is small and only the expansion molded product of 4.8 mm is obtained.

As the sections of the stampable sheet and the expansion molded product are observed by means of a microscope, the reinforcing fibers and thermal expandable particles are uniformly dispersed in the thickness direction.

Also, needle traces by needle punching are retained at the surface of the expansion molded product.

With respect to the expansion molded product, the three-point flexural test and the measurement of absorption ratio of vertically incident sound are further carried out in the same manner as in Example 1.

The results of the three-point flexural test on Examples 1-5 are also shown in Table 2. As seen from these results, a high value is obtained in all of the maximum load and elastic slope of the invention examples (Examples 1-3). On the contrary, the sufficient flexural strength and stiffness can not be obtained in the comparative example of Example 4 wherein the thermal expandable particles are aggregated and uniformly distributed and the comparative example of Example 5 wherein the thermal expandable particles are uniformly distributed and the needle traces are retained at the surface of the expansion molded product.

Also, the results measured on the absorption ratio of vertically incident sound in Examples 1-5 are shown in FIG. 1. From FIG. 1, it is understood that the expansion molded products according to the invention containing the thermal expandable particles eccentrically located toward the one-side face and having a high density layer at the surface thereof (Examples 1-3) are superior in the sound absorbing property to the expansion molded products of the comparative examples containing thermal expandable particles uniformly distributed and having no high density layer at the surface thereof (Examples 4, 5).

INDUSTRIAL APPLICABILITY

The expansion molded product according to the invention is light in the weight and excellent in the sound absorbing property and also excellent in the mechanical strength and surface property, so that it can be applied to not only the field of automobiles and building material but also the filed of household electrical goods.

The invention claimed is:

1. A web containing a thermoplastic resin, reinforcing fibers and thermal expandable particles dispersed therein, characterized in that the thermoplastic resin and the reinforcing fibers extending across an entire thickness of the web and are uniformly dispersed in a thickness direction and the thermal expandable particles are eccentrically located toward one-side surface of the web, wherein opposite sides of the web have substantially different specific gravity and density.

2. A stampable sheet comprising a single-layer having reinforcing fibers and thermal expandable particles dispersed into a matrix made of a thermoplastic resin, characterized in that the thermoplastic resin and the reinforcing fibers are uniformly dispersed in a thickness direction of the single-layer and the thermal expandable particles are eccentrically located toward one-side surface of the single-layer, wherein the one-side surface of the single-layer is lower in density and higher in porosity than an opposite-side surface of the single-layer.

3. A single-layer web containing a thermoplastic resin, reinforcing fibers and thermal expandable particles dispersed therein, wherein the thermoplastic resin and the reinforcing fibers are uniformly dispersed in a thickness direction and the thermal expandable particles are eccentrically located toward one-side surface of the single-layer web, wherein opposite sides of the single-layer web have substantially different specific gravity and density.

4. A one-layer stampable sheet comprising reinforcing fibers and thermal expandable particles dispersed into a matrix made of a thermoplastic resin, wherein the thermoplastic resin and the reinforcing fibers are uniformly dispersed in a thickness direction of the one-layer stampable sheet and the thermal expandable particles are eccentrically located toward one-side surface of the one-layer stampable sheet, wherein the one-side surface of the one-layer stampable sheet is lower in density and higher in porosity than an opposite-side surface of the one-layer stampable sheet.

5. A web having a single layer of matrix material containing thermoplastic resin, reinforcing fibers and thermal expandable particles dispersed therein, wherein the thermoplastic resin and the reinforcing fibers are uniformly dispersed in a thickness direction of the matrix material and the thermal expandable particles are eccentrically located toward one-side surface of the matrix material, wherein opposite sides of the matrix material have substantially different specific gravity and density.

6. A stampable sheet having a single layer of matrix material containing reinforcing fibers and thermal expandable particles dispersed in a thermoplastic resin, wherein the thermoplastic resin and the reinforcing fibers are uniformly dispersed in the matrix material along a thickness direction of the matrix material and the thermal expandable particles are eccentrically located toward one-side surface of the matrix material, wherein the one-side surface of the matrix material is lower in density and higher in porosity than an opposite-side surface of the matrix material.

* * * * *